Aug. 29, 1944.     J. J. ROHRBACH     2,357,267
TOP ARM SPECTACLES
Filed Sept. 20, 1941     2 Sheets-Sheet 1
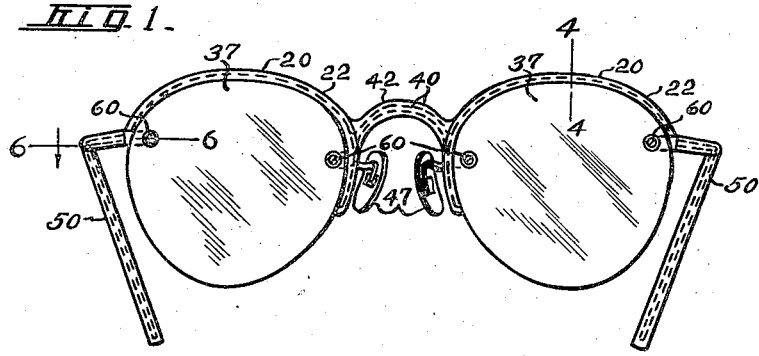
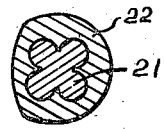
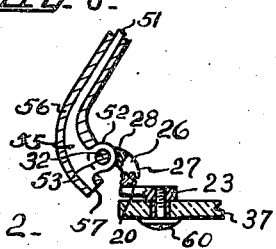
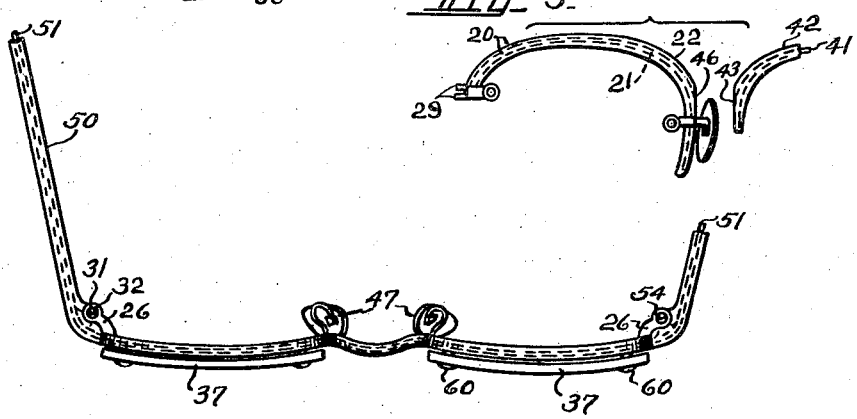
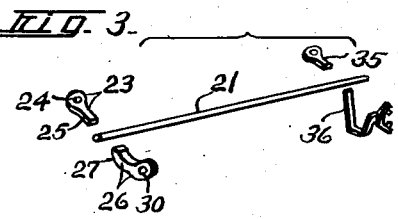
INVENTOR
JOHN J. ROHRBACH
BY Theodore L. Simonton
ATTORNEY

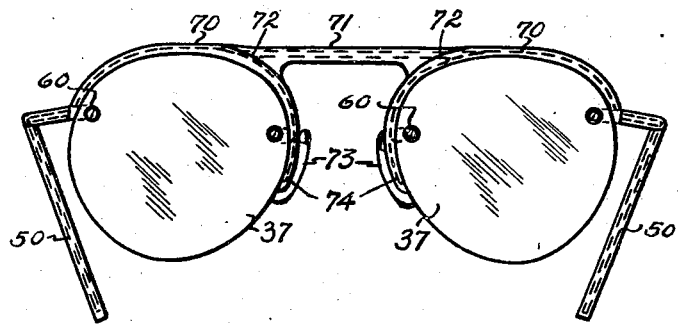
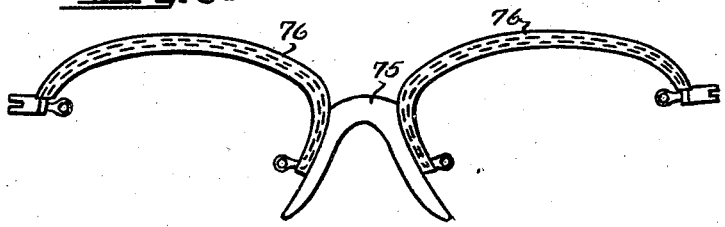
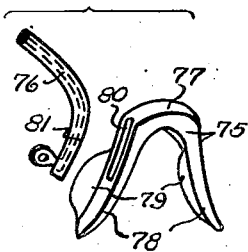
INVENTOR
JOHN J. ROHRBACH
BY Theodore E. Simonton
ATTORNEY Patented Aug. 29, 1944

2,357,267

UNITED STATES PATENT OFFICE 2,357,267

TOP ARM SPECTACLES

John J. Rohrbach, Rochester, N. Y., assignor to Shuron Optical Company, Inc., Geneva, N. Y., a corporation of New York Application September 20, 1941, Serial No. 411,707

13 Claims. (Cl. 88—41)

My invention is concerned with improvements in top arm spectacles and is directed more specifically to reinforced zylonite top arm spectacles.

One of the objects of my invention is to produce a top arm for spectacles having a wire core with the lens straps, endpiece, and pad arm soldered to the core to form a strong structural unit and having a zylonite casing entirely covering the core.

Another object of my invention is to provide zylonite top arm spectacles having a metal reinforcing core made up of a plurality of parts, the parts being securely fastened together to produce in effect an integral core.

Still another object of my invention is to provide an endpiece for zylonite spectacles constructed so as to position the pivot on which the temple is swung behind and outside of the spectacle frame and curving the temple inwardly around the pivot to conceal the same and so that the end of the temple abuts against the mounting to limit the outward swing of the temple, whereby the ear to ear distance may be adjusted by simply filing off the abutting end of the temple.

Another object of my invention is to provide wire reinforced top arms having zylonite casings and a zylonite bridge to which the top arms may be connected by fusing the zylonite casing to the zylonite bridge.

Other objects and advantages of my invention will become apparent upon reading the following specification in conjunction with the drawings in which:

Figure 1 is a front view of a pair of spectacles embodying the principles of my invention.

Figure 2 is a top plan view, parts being broken away, of the spectacles shown in Figure 1.

Figure 3 is an exploded perspective view of the core wire and metal parts associated therewith for a reinforced zylonite top arm.

Figure 4 is a cross-section of the reinforced zylonite top arm taken on the line 4—4 of Figure 1.

Figure 5 is an exploded front view, part being broken away, showing the preferred structure for a pair of reinforced zylonite top arm spectacles.

Figure 6 is a section, parts being broken away, taken on the line 6—6 of Figure 1.

Figure 7 is a front view of a pair of spectacles embodying the principles of my invention but showing a different treatment of the bridge.

Figure 8 is a front view of a pair of spectacles embodying the principles of my invention where- in the bridge member contains no reinforcing wire and the top arms are fused to the bridge.

Figure 9 is an exploded perspective, parts being broken away, showing details of the connection between the top arms and the bridge member of the spectacles shown in Figure 8.

Referring now to the drawings, the spectacles of my invention are built up from wire metal cores to which various parts are attached, the cores being covered with a zylonite casing to form a zylonite spectacle front. The top arms are similar in construction, and therefore it will be necessary to describe only one.

The top arm 20 is provided with a reinforcing wire or core 21. In the preferred form, the cross-section of the core 21 is as illustrated in Figure 4, and is well adapted to disperse the light rays and to minimize the visibility of the core when viewed through a transparent zylonite casing 22. It is, of course, understood that the zylonite casings may be translucent or opaque, in which case the shape of the reinforcing wire is not important since it would not be visible.

In constructing the top arms, the core 21 is first cut to the desired length from a piece of wire. A lens supporting lug or strap 23 having a threaded eye 24 and a shank 25 is soldered to the front side of the core 21 adjacent one end thereof. It is understood that the strap 23 may have a pair of ears disposed on opposite sides of the lens, or, as shown, be provided with the single threaded eye 24 for accommodating lens fastening means to be described later. An endpiece 26 is provided which has a rearwardly extending portion or shank 27 and an outwardly curved portion 28 which terminates in a pair of vertically spaced ears 29. Vertically aligned apertures 30 and 31 are provided in the ears 29. The aperture 30 in the endpiece 26 is threaded to receive a screw 32. The other aligned aperture 31 is made large enough so that the screw 32 may pass freely through it, and in the preferred form the aperture 31 may be countersunk to admit the head of the screw 32. The end of the shank 27 of the endpiece 26 is butt soldered to the rear side of the core 21 substantially opposite the strap 23. Another lens strap 35 is soldered to the front side of the core 21 a short distance from the opposite end thereof. A pad arm 36 is soldered to the rear side of the core 21 substantially opposite the strap 35. After the straps 23 and 35, endpiece 26 and pad arm 36 have been soldered to the core 21, the entire core 21 is completely covered with a zylonite casing 22 while leaving the lens straps, endpiece and pad arm exposed. The top arm is then shaped to conform substantially to the contour of the upper edge of the lens 37 to be supported.

The bridge comprises a core 41 and a zylonite casing 42. In making the bridge, a piece of wire is cut to the desired length for the core 41. The core 41 is then covered with the zylonite casing 42. A portion 43 of the outer side of the casing 42 is removed adjacent the ends of the bridge 40 to expose the core 41 for a short distance and to provide a flat surface, best seen in Figure 5, for a purpose presently to be described. A similar flat portion 46 is provided on the bridge end portion of the top arm 20. The flattened portions 43 and 46 are then brought together and the zylonite casings 22 and 42 are fused by heat or solvent or both to join the top arm to the bridge. The core 21 of the top arm and the core 41 of the bridge are thus brought into contact and give the appearance of being joined. A second top arm, similarly constructed, is similarly joined to the other side of the bridge. Nose pads 47 are loosely mounted on the pad arms 36 in any suitable manner.

The temples 50 are similar in construction and it will therefore be necessary to describe but one. The temple comprises a core wire 51 having a pivot lug 52 projecting laterally inward from the core wire 51 adjacent the forward end thereof. The pivot lug 52 may be separate and soldered to the core wire 51 or may be formed integrally therewith. The lug 52 is provided with an aperture 53 to accommodate the screw 32 which is inserted through the aperture 31 in one of the ears 29 of the endpiece 26. The screw 32 is screwed into the threaded aperture 30 in the other ear 29 of the endpiece 26. The forward portion 55 of the core wire 51 is curved inwardly as shown in Figure 6. A casing 56 of zylonite is molded around the core wire 51 to completely cover the core wire 51 but leaving the pivot lug 52 exposed. It is to be noted that when the complete temple 50 is assembled to the endpiece 26 and the temple swung outward, the end 57 of the temple is adapted to abut against the rearwardly projecting portion 27 of the endpiece 26 and thus limit the outward swing of the temple 50. To adjust the distance between the ear loops of the temples it is only necessary to file the end 57 of the temple 50. By removing material from the end 57 of the temple 50, the ear to ear distance may be increased thus providing a simple means for adjusting the frame to various head sizes. This system of adjustment obviates the necessity for bending or distorting the temples, which is an ordinary practice. With my construction the temples may be maintained straight and true thereby maintaining a pleasing appearance.

The lenses 37 are secured to the spectacle frame by drilling appropriate holes to receive the screws 60 and thus fasten the lenses to the lens straps or lugs 23 and 35. As the straps 23 and 35 are fastened to the front side of the core wire 21, the lenses 37 are thus positioned in front of the top arms 20 and serve in some measure to decrease the prominence of the top arms. It is to be noted that in the preferred form the top arms 20 project slightly above the lenses 37 and thus protect the lenses 37 if the spectacles be dropped so as to fall with the top arms downward.

The top arms 20 are reinforced in order that the top arms may be sufficiently strong and rigid to take shock and stress without transmitting strain to the supported lenses. Thus it is desirable that the bridge connecting the top arms be flexible to relieve stress on the top arms. In the preferred form of my invention the bridge reinforcing core 41 may be lighter than the cores 21 of the top arms. Furthermore, in the preferred form, the cores 21 and 41 are not joined together in order that the zylonite joint between the top arm and the bridge have greater freedom of flexure to relieve stress in the top arms when the spectacles are subjected to undue strain due to mishandling. However, as an alternate construction the cores 21 and 41 may be soldered together to form a continuous core before covering the cores with the zylonite casings 22 and 42.

In Figure 7 I have shown a modified form of spectacle frame wherein the top arms 70 are similar in shape and construction to the top arms described above, except that no metal pad arms are used, and wherein the bridge 71 is shaped differently from the bridge as shown in the modification previously described. After the top arms 70 have been assembled and covered with zylonite, a portion of the zylonite covering as at 72 is milled off to expose the core wire. The bridge 71 has the end portions milled off to conform to portions 72 and the bridge 71 is fastened to the top arms 70 by fusing the zylonite casings together. The nose pads 73 are formed of zylonite and may be integral with the side arms 74, which in this case are extended portions of the top arms 70, or the nose pads 73 may be molded separately and fused to the side arms 74.

In Figure 8 I have shown a top arm spectacle front embodying the principles of my invention but wherein the bridge 75 is formed of zylonite with no reinforcing core. The top arms and temples are similar in construction to the device as shown in Figures 1 to 6, inclusive, and described above, except that no metal pad arms are used in this modification. In the preferred embodiment of the front or mounting illustrated in Figure 8, the top arms 76 are each constructed as complete units. The bridge 75 is molded of zylonite and comprises crest 77, side arms 78 and nose pads 79. Extending downwardly from adjacent the top of each of the side arms 78 is a groove 80 formed in the outer side thereof. The grooves 80 are adapted to partially receive the bridge end portions 81 of the top arms 76. To assemble the frame, the portion 81 of the top arms 76 is placed in the groove 80 of the bridge 75 and fused either by heat or solvent or both, so that the zylonite covering of the top arm 76 becomes integrally joined with the zylonite bridge 75. It is, of course, understood that the particular shape of bridge illustrated in Figures 7 and 8 is not essential, and any suitable form of bridge may be used. Furthermore, with my unique scheme of construction, zylonite of one color can be used for the top arms, while a different color of zylonite can be used for the bridge.

Although I have shown and described particular embodiments of my invention, various changes in form, dimensions and arrangement of the parts will occur to those skilled in the art but will not depart from the spirit of my invention. I therefore wish to be limited only by the scope of the appended claims.

I claim:

1. A semi-rimless ophthalmic mounting comprising a bridge composed at least exteriorly of plastic material, a pair of top arms affixed to said bridge to extend outwardly along the top rims of a pair of lenses, each of said top arms consisting of a metal core wire and a casing of plastic material, a plurality of metal lens straps fastened to each of said top arm wires and projecting beyond said plastic casing, a metal endpiece fastened to each of said top arm wires adjacent the temple end thereof and projecting rearwardly and outwardly beyond said plastic casing, and a pair of temples made at least in part of plastic material pivotally secured one to each of said endpieces, the forward end of each of said temples curving forwardly and inwardly around the pivot point, and said temples, endpieces and top arms being so constructed and arranged that the metal endpieces are substantially wholly concealed from side or front view by the plastic material of the temples and top arms when said mounting is in wearing position.

2. A semi-rimless ophthalmic mounting as claimed in claim 1 in which said top arms are affixed to said bridge solely by union of the plastic material of said top arms to the plastic material of said bridge.

3. A semi-rimless ophthalmic mounting as claimed in claim 1 in which said bridge comprises a metal reinforcement and said top arms are affixed to said bridge solely by union of the plastic material of said top arms to the plastic material of said bridge.

4. A semi-rimless ophthalmic mounting as claimed in claim 1 in which said bridge has plastic side arms provided with grooves in which the plastic casings of the bridge ends of said top arms are received.

5. A semi-rimless ophthalmic mounting comprising a bridge composed of a metal reinforcement encased in plastic material, a pair of top arms affixed to said bridge to extend outwardly along the top rims of a pair of lenses, each of said top arms consisting of a metal core wire and a casing of plastic material, said top arms being affixed to said bridge solely by union of the plastic material of said top arms to the plastic material of said bridge, a pair of metal lens straps fastened to each of said top arm wires and projecting beyond said plastic casing, a metal endpiece fastened to each of said top arm wires adjacent the temple end thereof and projecting beyond said plastic casing, and a pair of temples pivotally secured one to each of said endpieces.

6. A semi-rimless ophthalmic mounting as claimed in claim 5 in which said lens straps comprise lugs located one adjacent the bridge end and another adjacent the temple end of each of said top arm wires and constructed to bear on the rear surfaces only of the lenses and to position the lenses in front of their respective top arms.

7. A semi-rimless ophthalmic mounting comprising a bridge composed at least exteriorly of plastic material, a pair of top arms affixed to said bridge to extend outwardly along the top rims of a pair of lenses, each of said top arms consisting of a metal core wire and a casing of plastic material, a pair of metal lens supporting lugs fastened to each of said top arm wires and projecting beyond said plastic casing, said lugs being located one adjacent the bridge end and another adjacent the temple end of each of said top arm wires and being constructed to bear on the rear surfaces only of the lenses and to position the lenses in front of their respective top arms, a metal endpiece fastened to each of said top arm wires adjacent the temple end thereof and directly behind a corresponding lens supporting lug, said endpieces projecting rearwardly and outwardly beyond said plastic casing, and a pair of temples made at least in part of plastic material pivotally secured one to each of said endpieces, the forward end of each of said temples curving forwardly and inwardly around the pivot point, and said temples, endpieces and top arms being so constructed and arranged that the metal endpieces are substantially wholly concealed from side or front view by the plastic material of the temples and top arms when said mounting is in wearing position.

8. A semi-rimless ophthalmic mounting as claimed in claim 7 in which said top arms are affixed to said bridge solely by union of the plastic material of said top arms to the plastic material of said bridge.

9. A semi-rimless ophthalmic mounting as claimed in claim 7 in which said bridge comprises a metal reinforcement and said top arms are affixed to said bridge solely by union of the plastic material of said top arms to the plastic material of said bridge.

10. A semi-rimless ophthalmic mounting as claimed in claim 7 in which said bridge has plastic side arms provided with grooves in which the plastic casings of the bridge ends of said top arms are received.

11. A semi-rimless ophthalmic mounting comprising a bridge composed at least exteriorly of plastic material, a pair of top arms affixed to said bridge to extend outwardly along the top rims of a pair of lenses, each of said top arms consisting of a metal core wire and a casing of plastic material, said top arms being affixed to said bridge solely by union of the plastic material of the one to the plastic material of the other, a pair of metal lens supporting lugs fastened to each of said top arm wires and projecting beyond said plastic casing, said lugs being located one adjacent the bridge end and another adjacent the temple end of each of said top arm wires and being constructed to bear on the rear surfaces only of the lenses and to position the lenses in front of their respective top arms, a metal endpiece fastened to each of said top arm wires adjacent the temple end thereof and directly behind a corresponding lens supporting lug, said endpieces projecting rearwardly and outwardly beyond said plastic casing, and a pair of temples pivotally secured one to each of said endpieces, each of said temples comprising a metal core wire, a metal pivot lug fastened thereto adjacent the forward end thereof and extending laterally on the inward side of the respective temple and a casing of plastic material covering said temple core wire while leaving said pivot lug exposed, the forward end of each of said temples curving forwardly and inwardly around the pivot lug and abutting against the cooperating endpiece to limit the outward swing of the temple, and said temples, endpieces and top arms being so constructed and arranged that the metal endpieces are substantially wholly concealed from side or front view by the plastic material of the temples and top arms when said mounting is in wearing position.

12. A semi-rimless ophthalmic mounting as claimed in claim 11 in which said bridge comprises a metal core wire encased in plastic material.

13. A semi-rimless ophthalmic mounting as claimed in claim 11 in which said bridge has plastic side arms provided with grooves in which the plastic casings of the bridge ends of said top arms are received.

JOHN J. ROHRBACH.